Feb. 7, 1939.　　　　W. HARTZ　　　　2,145,927
AUTOMATIC VARIABLE SPEED TRANSMISSION
Filed July 23, 1936　　　　2 Sheets-Sheet 1
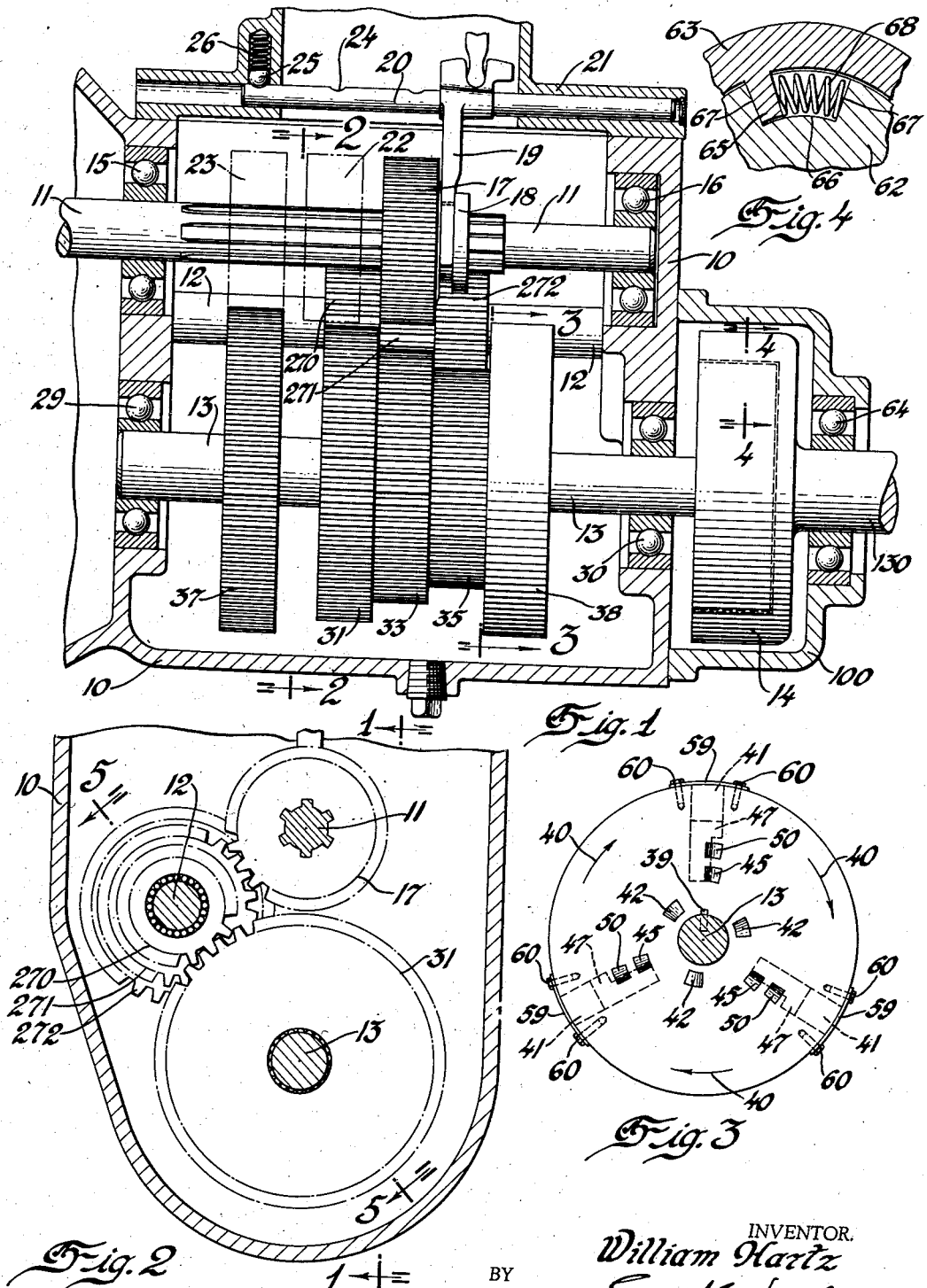
INVENTOR.
William Hartz
Everett F. Wright
ATTORNEY.

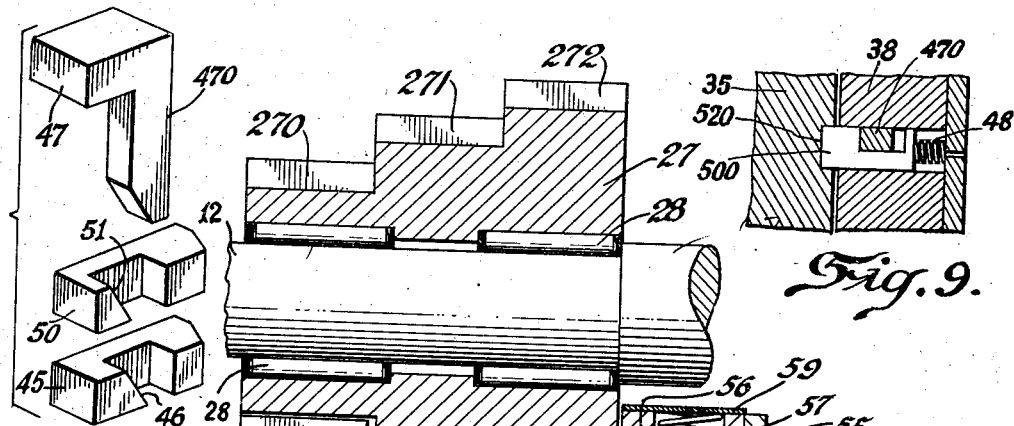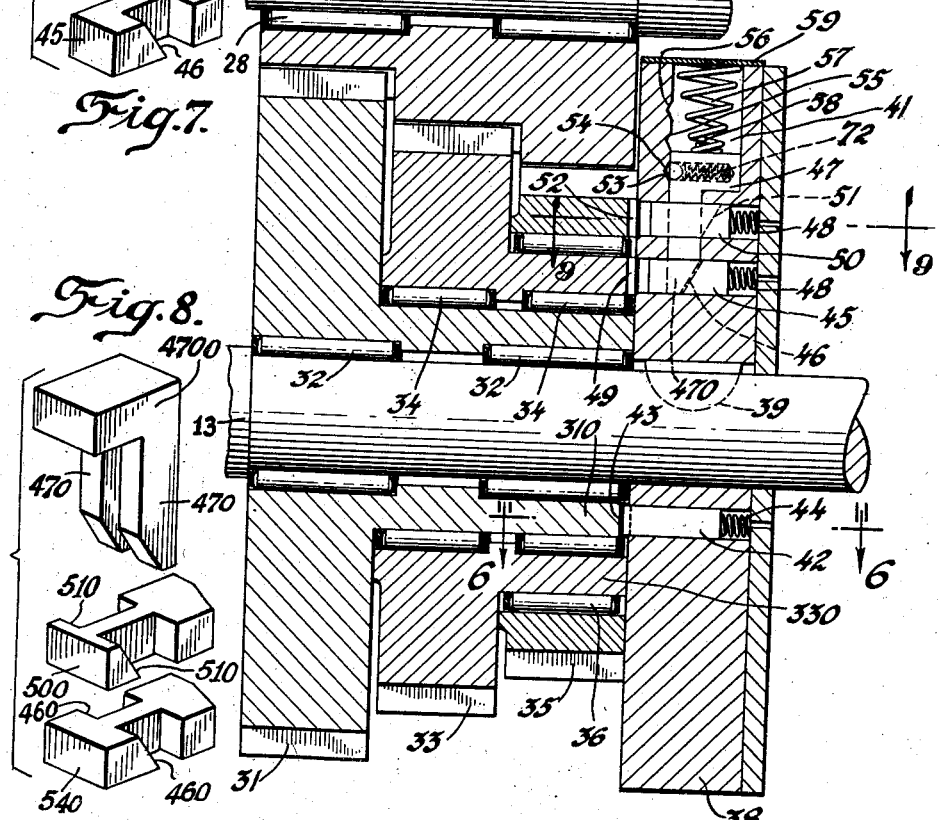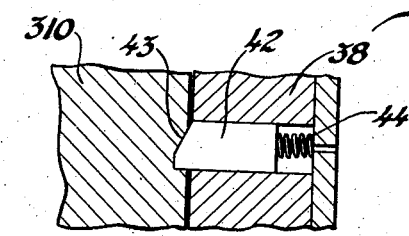

Patented Feb. 7, 1939

2,145,927

UNITED STATES PATENT OFFICE 2,145,927

AUTOMATIC VARIABLE SPEED TRANSMISSION

William Hartz, Detroit, Mich.

Application July 23, 1936, Serial No. 92,167

7 Claims. (Cl. 74—336.5)

This invention relates to variable speed transmissions and in particular to means for changing gear ratios in a type of transmission generally adapted for use in motor vehicles and the like.

One object of the invention is to provide, in combination with a transmission, simple, inexpensive means for automatically varying the gear ratio between a driving shaft and a driven shaft responsive to the speed of the driven shaft whereby the speed of the driving shaft is maintained substantially constant during the change of gear ratio.

Another object of the invention is to provide a simple compact inexpensive centrifugal controlled ratchet type automatic gear selector for transmissions.

Another object of the invention is to provide a constant mesh variable speed transmission for automotive vehicles wherein a plurality of changes in forward speed ratios may be accomplished automatically under control of the centrifugal force of the driven shaft thereof.

Other objects of the invention will become apparent by reference to the following detailed description taken in connection with the accompanying drawings, in which:

Fig. 1 is a longitudinal sectional view of a transmission embodying the invention taken on the line 1—1 of Fig. 2.

Fig. 2 is a cross sectional view taken on the line 2—2 of Fig. 1.

Fig. 3 is an end elevational view of a ratchet type automatic gear selector unit embodying the invention taken on the line 3—3 of Fig. 1.

Fig. 4 is a fragmentary sectional view of a torque impact absorbing mechanism which may be used with the invention.

Fig. 5 is an enlarged sectional view taken on the line 5—5 of Fig. 2 showing the forward gearing of the transmission disclosed in Fig. 1 with the ratchet type automatic gear selector engaged in its low speed position.

Fig. 6 is a fragmentary sectional view taken on the line 6—6 of Fig. 5 looking in the direction indicated by the arrows.

Fig. 7 is an exploded view in perspective showing more or less diagrammatically the relation between a cam and a set of high speed ratchet stops employed in the invention.

Fig. 8 is an exploded view in perspective similar to Fig. 7 indicating an alternate cam and ratchet construction.

Fig. 9 is a fragmentary sectional view taken on line 9—9 of Fig. 5 looking in the direction indicated by the arrows showing how ratchet stops may be made to avoid free-wheeling in high gear.

Referring now to the drawings wherein like numerals refer to like and corresponding parts throughout the several views, the embodiment of the invention disclosed comprises, in general, a housing 10, a drive shaft 11 which is preferably connected to a source of power such as an automotive engine through a suitable clutch in the usual manner, an idler shaft 12, and a driven shaft 13 which may be connected through any suitable torque impact absorbing mechanism 14, if such is desirable, and a universal joint, not shown, to the propeller shaft of a motor vehicle; the said shafts 11, 12 and 13 being inter-connected by a plurality of gears as hereinafter described.

The drive shaft 11 is journaled at one end in the housing 10 by means of the bearing 15 and has the other end thereof journaled through the front of the said housing 10 by means of the bearing 16. A driving gear 17 having a shift collar 18 is splined on the drive shaft 11 for rotation therewith and longitudinal movement thereon. The said driving gear 17 is shown in Fig. 1 engaged with the gearing 271 of the triple idler gear 27; however, it may be shifted by means of the usual shift fork 19 on a shaft 20 slideably mounted in the top plate 21 of the housing 10 to a neutral position as indicated by the dash and two dot lines 22 or into a reverse positon as indicated by the dash and dot lines 23. The shift fork 19 and shaft 20 may be moved to the desired position by any manual means not shown; however, it is preferable to prevent the said shaft 20 and shift fork 19 thereon from creeping by providing the said shaft 20 with a plurality of suitably disposed notches 24 into which a ball detent 25 is urged by a spring 26 as shown in Fig. 1 for releasably maintaining the shaft 20, shift fork 19 and driving gear 17 in the position into which they are shifted.

The idler shaft 12 is mounted in each end of the housing 10 and is preferably keyed against rotation therein. The idler shaft 12 is suitably shouldered to accommodate a triple idler gear 27 rotatably mounted thereon by such suitable means as the roller bearings 28. The said triple idler gear 27 is preferably formed with the low speed gearing 270, intermediate speed gearing 271 and high speed gearing 272 thereof all rotating at the same speed and driven by the driving gear 17 when the said driving gear 17 is meshed with the intermediate speed gearing 271 thereof.

Although the embodiment of the invention disclosed herein indicates that the driving gear 17 meshes with the intermediate speed gearing 271 of the triple idler gear 27, the said driving gear 17 may be arranged to mesh with the low speed gearing 270 or the high speed gearing 272 if lower or higher engine speeds are desirable.

The driven shaft 13 is journaled at one end in the housing 10 by means of the bearing 29 and has the other end thereof journaled through the rear of the said housing 10 by means of the bearing 30. The driven shaft 13 is suitably shouldered to accommodate a low speed driven gear 31 rotatably mounted thereon by such suitable means as the roller bearings 32. The said low speed driven gear 31 is provided with an axially extending collar 310 which serves as a shaft upon which intermediate speed driven gear 33 is rotatably mounted by such suitable means as the roller bearings 34. The said intermediate speed driven gear 33 is provided with an axially extending collar 330 which serves as a shaft upon which high speed driven gear 35 is rotatably mounted by such suitable means as the roller bearing 36. Thus, the low speed driven gear 31, intermediate speed driven gear 33 and high speed driven gear 35 are adapted to freely rotate in respect to each other and the driven shaft 13. As shown in Fig. 5, the end faces of the axially extending collars 310 and 330 and the rear face of the high speed driven gear 35 are in radial alignment in respect to each other. A reverse gear 37 is keyed on the driven shaft 13 in a position to be readily engaged by the driving gear 17 as hereinbefore described.

A ratchet type automatic gear selector unit 38 is mounted on the driven shaft 13 and keyed thereto by a key 39 for rotation therewith and is located in operating spaced relation to the end faces of the said axially extending collars 310 and 330 and the rear face of the high speed driven gear 35. The direction of rotation of the gear selector 38 and the driven shaft 13 during low, intermediate and high forward speeds is shown by the arrows 40 in Fig. 3.

The automatic gear selector unit 38 is cylindrical in shape and is provided with one or more preferably rectangular radially disposed chases 41 equally spaced in respect to each other around the periphery of the said gear selector unit 38, three of the said chases 41 being provided in the embodiment of the invention shown in the drawings. In the embodiment of the gear selector unit 38 shown in the drawings, a plurality of axially disposed low speed ratchet stops 42 are provided circumferentially spaced at 120 degrees in respect to each other at a radius from the center of the driven shaft 13 which will permit the same to register with and engage the end of the collar 310 of the low speed gear 31 at the notches 43 therein. The said low speed ratchet stops 42 are axially mounted for reciprocation in suitable axial apertures in the said gear selector unit 38 and are constantly urged toward and into engagement with the end of the low speed collar 310 of the low speed gear 31 by means of suitable springs 44, see Fig. 6.

The said notches 43 in the end face of the low speed collar 310 of the low speed gear 31 are suitably beveled and are radially and circumferentially located to receive simultaneously the complementarily beveled ends of the low speed ratchet stops 42 which are constantly urged into registry with said notches 43. The low speed ratchet stops 42 may be provided in any number and size with a like or greater number of cooperating notches 43 provided in the said low speed collar 310.

A plurality of axially disposed intermediate speed ratchet stops 45 each having a beveled cam follower 46 integral therewith are suitably located and mounted for reciprocation in axially disposed apertures in the said gear selector unit 38 so as to permit a cam 47 mounted for radial reciprocation in the rectangular radially disposed chases 41 to engage the said cam follower 46 during the radial reciprocation of the said cam 47 as hereinafter described. The said intermediate speed ratchet stops 45 are constantly urged toward and into engagement with the end of the intermediate speed collar 330 of the intermediate speed gear 33 by means of suitable springs 48.

The said intermediate speed collar 330 is provided with a plurality of suitably beveled notches 49 in the end face thereof radially and located to receive simultaneously the complementarily beveled ends of the intermediate speed ratchet stops 45 which are constantly urged into registry with the said beveled notches 49 under the control of the cam 47. One intermediate speed ratchet stop 45 is provided for each radial reciprocating cam 47; however, a like or greater number of cooperating notches 49 may be provided in the said intermediate speed collar 330.

A plurality of axially disposed high speed ratchet stops 50 each having a beveled cam follower 51 integral therewith are suitably located and mounted for reciprocation in axial apertures in the said gear selector unit 38 so as to permit the cam 47 mounted for radial reciprocation in the radially disposed chases 41 to engage the said cam follower 51 during the radial reciprocation of the said cam 47 hereinafter described. The said high speed ratchet stops 50 are constantly urged toward and into engagement with the high speed gear 35 by means of suitable springs 48.

By referring to Fig. 7, the relation between the radially disposed cam 47, the axially disposed intermediate speed ratchet stops 45, and the axially disposed high speed ratchet stops 50 is readily observed.

The said high speed gear 35 is provided with a plurality of suitably beveled notches 52 in the rear face thereof radially and circumferentially located to receive simultaneously the complementarily beveled ends of the high speed ratchet stops 50 which are constantly urged into registry with the said beveled notches 52 under control of the cam 47. One high speed ratchet stop 50 is provided for each radially reciprocating cam 47; however, a like or greater number of cooperating notches 52 may be provided in the said high speed gear 35.

The cam 47 mounted for radial reciprocation in each of the said radially disposed chases 41 is preferably rectangular in shape and provided with an integral inwardly extending rectangular finger 470 which is beveled at the end thereof forming a cam surface against which the complementary beveled cam followers 46 and 51 of the intermediate and high speed ratchet stops 45 and 50 respectively contact when the said cam 47 reciprocates radially.

The said cam 47 and ratchet stops 45 and 50 may be constructed as shown in Fig. 8 in which event the cam 4700 illustrated more or less diagrammatically therein is wider than the cam 47 and is provided with two radially spaced parallel inwardly extending fingers 470 beveled on their ends to form cam surfaces. When cams 4700 are substituted for cams 47, intermediate and high speed ratchet stops 450 and 500 are provided with dual cam followers 460 and 510 respectively complementarily beveled in respect to the beveled surface of the cam fingers 470.

Each cam 47 is provided with an axially disposed bore preferably in the main body portion thereof into which a spring 72 and ball detent 53 are positioned in such a manner as to constantly urge the ball detent 53 axially for releasable engagement in suitably spaced notches 54, 55 and 56 in the wall of the radially disposed chases 41 during the radial movement of the said cam 47, thus permitting the cam 47 to reciprocate radially in intermittent steps in accordance with the centrifugal or centripetal forces thereon. The location of the said notches 55, 55 and 56 is such as will stop the movement of the radially reciprocating cam 47 in such positions as will control the low speed, intermediate speed and high speed gear ratios respectively between the idler shaft 12 and the driven shaft 13.

A suitable preferably conical spring 57 having one end thereof centered around a tab 58 on the outer end of each radially disposed cam 47 reacts against a cover plate 59 secured by the bolts 60 on the periphery of the said gear selector unit 38 and provides the centripetal force to constantly urge the said cam 47 to its low speed position as indicated in Fig. 5 with the intermediate speed ratchet stops 45 and the high speed ratchet stops 50 controlled by the said cam 47 out of engagement with the intermediate speed gear 33 and high speed gear 35 respectively. The weight of the cam 47 and the rate of rotation of the gear selector unit 38 on the driven shaft 13 provides a variable centrifugal force which overcomes the centripetal force applied to the cam 47 by the conical spring 57, which spring offers a greater resistance to compression as it is compressed by the radial movement of the cam 47.

A suitable torque impact mechanism 14 shown in Figs. 1 and 4 may be used if desired to reduce the torque impact when the automatic gear selector 38 changes from a low to intermediate or from intermediate to high speed gears. The embodiment of the torque impact mechanism 14 indicated in the drawings comprises a cylindrical element 62 keyed on the end of the driven shaft 13, a cylindrical cup 63 mounted for rotation therearound and a driven shaft 130 on said cup 63 rotatably mounted through a supplementary housing 100 by means of a suitable bearing 64. A plurality of inwardly disposed teeth 65 within the said cup 63 are positioned in suitable notches 66 in the periphery of the cylindrical element 62 which engage the radially disposed shoulders 67 of the said cylindrical element 62. A suitable spring 68 circumferentially disposed in the said notches 66 cushions the impact between the said cylindrical element 62 and the cup 63 when torque impact occurs. The notches 66 may be made circumferentially longer than shown in Fig. 4 and a spring 68 may be inserted on both sides of the said teeth 65 within the notches 66 for reducing the torque impact that occurs when the speed of the driven shaft is suddenly increased or decreased when rotating in either direction.

The operation of the automatic variable speed transmission disclosed herein is manual for shifting from neutral to low or reverse and is accomplished in the conventional manner. However, once shifted into low gear, the automatic gear selector unit 38 engages low, intermediate or high speed gears fully automatically under the control of the speed of the driven shaft 13.

The shifting of the driving gear from neutral to low forward speed is accomplished in the conventional manner by manually causing the driving gear 17 splined on the drive shaft 11 to mesh with the gearing 271 of the triple idler gear 27. The triple idler gear 27 rotates the low speed gear 31, intermediate speed gear 33 and high speed gear 35 simultaneously, all at their various speeds freely in respect to each other and the driven shaft 13 on which they are rotatably mounted.

The gear selector unit 38 keyed on the driven shaft 13 for driving the same is normally rotated by the low speed gear 31 with the low speed ratchet stops 42 thereof constantly urged into engagement with the collar of the low speed gear 31 by the springs 44. As the speed of the driven shaft 13 is increased, the centrifugal force on the said cams 47 overcomes the centripetal force exerted thereon by the springs 57 and the said cams 47 move radially outward thereby permitting the intermediate speed ratchet stops 45 to engage the intermediate speed gear 33 which then drives the driven shaft 13. As the speed of the driven shaft 13 is again increased, the additional centrifugal force on the said cams 47 overcomes the centripetal force exerted thereon by the springs 57 and the said cams 47 move radially outward thereby permitting the high speed ratchet stops 50 to engage the high speed gear 35 which then drives the driven shaft 13. The converse is true as the speed of the driven shaft is on the decrease rather than on the increase.

Because of the fact that the ratchet stops 42, 45 and 50 are beveled and engage complementarily beveled notches in the gearing 31, 33 and 35, the gears that are not working at any particular stage of operation of the gear selector unit idle with the idler gear 271. When the power is relieved on the drive shaft 11, the transmission serves as a free wheeling unit. However, inasmuch as free wheeling is not desirable at high speeds, the high speed ratchet stops 50 preferably may be made with square or rectangular ends and the complementary notches 52 in the high speed gear 35 may be square or rectangular, which construction eliminates free wheeling during high speeds when the high speed gear 35 is engaged by the gear selector unit 38. Fig. 9 indicates anti-free wheeling construction for high speeds in which the high speed gear 35 is provided with rectangular notches 520 which accommodate the rectangular ended high speed ratchet stops 500 of the gear selector unit 38.

When the driving gear 17 is manually shifted into engagement with the reverse gear 37, the forward speed gears idle with the idler gear 27 and the ratchet stops 42 click by the notches 43 in the low speed gear 31.

Although but one embodiment of the invention has been disclosed and described in detail, it will be understood that various changes including the size, shape, arrangement and detail of parts thereof may be made without departing from the spirit of the invention, and it is not my intention to limit the scope of the invention other than by the terms of the appended claims.

I claim:

1. In a variable speed transmission, a drive shaft, an idler shaft and a driven shaft, a driving gear on said drive shaft, a triple idler gear on said idler shaft driven by said driving gear; low, intermediate and high speed driven gears in constant mesh with said triple idler gear simultaneously rotatable thereby at various speeds in respect to each other mounted in nested relationship to each other on said driven shaft for free rotation in respect thereto, an automatic gear selector unit mounted on said driven shaft adapted to rotate the same, axially movable means in said gear selector unit normally urged into engagement with said driven gears, and radially reciprocating cam means movable responsive to the speed of said driven shaft adapted to permit only one of said driven gears to be engaged by said axially movable means at any one time.

2. In a variable speed transmission, a drive shaft, an idler shaft and a driven shaft, a driving gear on said drive shaft, a triple idler gear on said idler shaft driven by said driving gear; low, intermediate and high speed driven gears in constant mesh with said triple idler gear simultaneously rotatable thereby at various speeds in respect to each other mounted in nested relationship to each other on said driven shaft for free rotation in respect thereto, the said nested driven gears having one end face thereof in radial alignment in respect to each other, axially disposed notches in the said radially aligned ends of said nested driven gears, an automatic gear selector unit keyed on said driven shaft adjacent said aligned ends of said driven gears, means in said gear selector unit axially urged into engagement with said notches in said driven gears, and means responsive to the speed of the driven shaft adapted to disengage one or more of said means axially urged into engagement with said driven gears whereby to permit the said driven shaft to be rotated by the highest speed driven gear not disengaged.

3. In a variable speed transmission, a drive shaft, an idler shaft and a driven shaft, a driving gear on said drive shaft, a triple idler gear on said idler shaft driven by said driving gear; low, intermediate and high speed driven gears in constant mesh with said triple idler gear simultaneously rotatable thereby at various speeds in respect to each other mounted in nested relationship to each other on said driven shaft for free rotation in respect thereto, the said nested driven gears having one end face thereof flush in respect to each other and a plurality of beveled notches in said end faces of said driven gears, an automatic gear selector unit keyed on said driven shaft adjacent to said notched end faces of said driven gears, and axially disposed ratchet stops in said gear selector unit adapted to selectively engage said driven gears responsive to the speed of said driven shaft whereupon said driven shaft is rotated by the highest speed driven gear engaged by said ratchet stops of said gear selector unit.

4. In a variable speed transmision, a drive shaft, an idler shaft and a driven shaft, a driving gear on said drive shaft, a triple idler gear on said idler shaft driven by said driving gear; low, intermediate and high speed driven gears in constant mesh with said triple idler gear simultaneously rotatable thereby at various speeds in respect to each other mounted in nested relationship to each other on said driven shaft for free rotation in respect thereto, the said nested driven gears having one end face thereof flush in respect to each other and a plurality of beveled notches in said end faces of said driven gears, an automatic gear selector unit keyed on said driven shaft adjacent to said notched end faces of said driven gears, axially disposed low speed ratchet stops in said gear selector unit normally engage in beveled notches in said low speed driven gear, and intermediate and high speed axially disposed ratchet stops in said gear selector unit adapted to selectively engage said driven gears responsive to the speed of said driven shaft whereupon said driven shaft is rotated by the highest speed driven gear engaged by said ratchet stops of said gear selector unit.

5. In a variable speed transmission, a drive shaft, an idler shaft and a driven shaft, a driving gear on said drive shaft, a triple idler gear on said idler shaft driven by said driving gear; low, intermediate and high speed driven gears in constant mesh with said triple idler gear simultaneously rotatable thereby at various speeds in respect to each other mounted in nested relationship to each other on said driven shaft for free rotation in respect thereto, the said nested driven gears having one end face thereof flush in respect to each other, the low and intermediate speed driven gears having beveled notches in said end face thereof, the high speed driven gear having square shouldered notches in said end face thereof, low speed axially disposed ratchet stops in said gear selector unit normally engaging said low speed driven gear at the beveled notches therein, intermediate speed axially disposed ratchet stops and high speed square shouldered axially disposed stops in said gear selector unit constantly urged toward engagement with said intermediate and high speed driven gears at the beveled and square shouldered notches therein, and a plurality of axially reciprocating cams in said gear selector unit responsive to the speed of the driven shaft adapted to permit said intermediate and high speed stops to selectively engage said intermediate and high speed driven gears whereby said driven shaft is rotated by the highest speed driven gear engaged by said gear selector unit.

6. In a variable speed transmission, a drive shaft, an idler shaft and a driven shaft, a driving gear on said drive shaft, a triple idler gear on said idler shaft driven by said riving gear; low, intermediate and high speed driven gears in constant mesh with said triple idler gear simultaneously rotatable thereby at various speeds with respect to each other mounted in nested relationship to each other on said driven shaft for free rotation with respect thereto, an automatic gear selector unit secured to said driven shaft, radially reciprocating cam means in said gear selector unit movable responsive to the speed of the said driven shaft, and axially movable means in the said gear selector unit actuated by said radially reciprocating cam means adapted to engage one of the said driven gears at any one time.

7. In a variable speed transmission, a drive shaft, an idler shaft and a driven shaft, a driving gear on said drive shaft, a triple idler gear on said idler shaft driven by said driving gear; low, intermediate and high speed driven gears in constant mesh with said triple idler gear simultaneously rotatable thereby at various speeds with respect to each other mounted in nested relationship to each other on said driven shaft for free rotation with respect thereto, an automatic gear selector unit mounted on said driven shaft adapted to rotate the same, axially movable means in the said gear selector unit normally urged into engagement with said driven gear, and radially reciprocating cam means movable to predetermined positions in response to the speed of the said driven shaft and adapted to permit only one of said driven gears to be engaged by said axially movable means at any one time.

WILLIAM HARTZ.